United States Patent [19]

Vasconi et al.

[11] Patent Number: 4,908,196

[45] Date of Patent: Mar. 13, 1990

[54] BORIC OXIDE PREPARATION METHOD

[75] Inventors: Antonio Vasconi, Melegnano; Paolo Mazzinghi, Pomarance, both of Italy

[73] Assignee: Societa Chimica Larderello S.p.A., Milan, Italy

[21] Appl. No.: 68,040

[22] Filed: Jun. 29, 1987

[30] Foreign Application Priority Data

Jul. 16, 1986 [IT] Italy ................................. 21142 A/86

[51] Int. Cl.$^4$ ............................................. C01B 35/10
[52] U.S. Cl. .................................... 423/278; 423/283
[58] Field of Search ............... 423/278, 283; 23/293 R, 23/294 R

[56] References Cited

FOREIGN PATENT DOCUMENTS

| 739081 | 3/1970 | Belgium | ............................ 423/278 |
| 467440 | 12/1951 | Italy | .................................. 423/278 |
| 155217 | 7/1986 | Japan | . |
| 182112 | 8/1987 | Japan | .................................. 423/278 |
| 199120 | 11/1966 | U.S.S.R. | ............................... 423/278 |

OTHER PUBLICATIONS

Roy M. Adams, Editor, *Boron Metallo-Boron, Compounds and Boranes,* Interscience Publishers, (New York), 1964 pp. 54, 55, 62, 61, 64–72.
Kirk–Othmer Encyclopedia of Chemical Technology, 3rd ed. John Wiley & Sons, 1978, vol. 4, pp. 71–73.

*Primary Examiner*—Jeffrey E. Russel
*Attorney, Agent, or Firm*—Hedman, Gibson, Costigan & Hoare

[57] ABSTRACT

High-purity boric oxide which does not adhere to the reactor walls is obtained by:

(a) gradually heat in boric acid, with the absence or substantial absence of fusion phenomena, at increasing temperature to a value not exceeding about 150° C.; operating at below atmospheric pressure, to eliminate water until the boric acid has been completely or substantially completely converted into metaboric acid;

(b) gradually heating the metaboric acid obtained in stage (a), with the absence or substantial absence of fusion phenomena, at increasing temperature to a value not exceeding about 400° C., operating at below atmospheric pressure, to eliminate water until the metaboric acid has been completely or substantially completely converted into boric oxide.

6 Claims, No Drawings

BORIC OXIDE PREPARATION METHOD

This invention relates to an improved method for producing boric oxide from boric acid.

Boric oxide is a product useful in industry, for example in the glass, ceramic and enamel sectors. It is known to prepare boric oxide by heating boric acid to a temperature at which the acid is completely dehydrated.

Some known methods operate at atmospheric pressure with a dehydration temperature exceeding 550° C. Under these conditions, the boric acid completely loses its combined water and is converted into molten boric oxide which on cooling produces a hard, compact solid mass.

One of the problems of such a method of operation is the impurities present in the boric oxide obtained, these deriving essentially from corrosion of the metal apparatus used for dehydrating the boric acid.

It has therefore been proposed in the art to use reactors clad with refractory material, in particular graphite and silica. However this method, besides being costly, is not without other defects. In this respect, if graphite cladding is used, abrasion of the cladding takes place to give rise to a certain contamination of the boric oxide produced.

Silica cladding on the other hand results in strong adhesion of the solid boric oxide to the reactor walls, with consequent removal and recovery difficulty.

Other drawbacks of the aforesaid known methods derive from the morphology of the boric oxide obtained, this being in the form of a hard, compact solid product which is non-uniform in appearance and therefore requires costly crushing, grinding and homogenisation before its commercial use.

The aforesaid drawbacks have been partly solved by the method of italian patent No. 467,440, by which boric oxide is obtained by dehydrating boric acid at below atmospheric pressure at a temperature of the order of 350° C.

Under these conditions, apparatus corrosion phenomena are reduced, to consequently obtain a boric oxide of improved purity. In addition, the morphological characteristics of such a boric oxide are also improved, it being in the form of a light, spongy friable mass. One drawback which has not been satisfactorily solved by the method of the aforesaid Italian patent is that of boric oxide adhesion, so that it is not always simple to remove it from the apparatus used for dehydrating the boric acid.

The object of the present invention is to obviate the drawbacks of the known art by a method which enables boric oxide to be obtained at high purity level and with excellent morphological characteristics by dehydrating boric acid under conditions in which adhesion phenomena are absent or substantially absent.

More particularly, according to the present invention boric oxide is prepared by dehydrating boric acid using a method comprising:

(a) gradually heating the boric acid, with the absence or substantial absence of fusion phenomena, at increasing temperature to a value not exceeding about 150° C., operating at below atmospheric pressure, to eliminate water until the boric acid has been completely or substantially completely converted into metaboric acid;

(b) gradually heating the metaboric acid obtained in stage (a), with the absence or substantial absence of fusion phenomena, at increasing temperature to a value not exceeding about 400° C., operating at below atmospheric pressure, to eliminate water until the metaboric acid has been completely or substantially completely converted into boric oxide;

(c) recovering the boric oxide obtained in stage (b).

Consequently according to the present invention a method is used comprising two consecutive stages, in the first of which the boric acid ($H_3BO_3$) is converted into metaboric acid ($HBO_2$) and in the second of which the metaboric acid obtained is converted into boric oxide ($B_2O_3$). Moreover, in both stages the temperature prevailing at every moment is such as to substantially prevent even partial fusion of the reaction mixture constituents.

Stage (a)

In the first reaction stage the boric acid is heated gradually from ambient temperature (20°-25° C.) to a maximum value not exceeding about 150° C. and preferably not exceeding about 125° C. In order to remove the water evolved as a reaction byproduct, the operation is carried out at below atmospheric pressure. Good water removal is obtained on operating conveniently at a pressure of between 10 and 30 mmHg, even though still useful results are obtained outside this range.

The reaction mixture is conveniently kept moving during boric acid dehydration, for example by using a rotating vessel or one provided with a stirrer. In practice, the temperature can be increased fairly rapidly to the order of 115-125° C., at which copious water development takes place.

When this development subsides, the temperature can be further raised, but without exceeding a value of about 150° C. When operating under the aforesaid conditions, the time necessary for converting the boric acid into metaboric acid is generally of the order of 1-2 hours. In this reaction stage, the boric acid ($H_3BO_3$) is essentially converted into orthorhombic metaboric acid ($HBO_2$ III) (see Gmelin, volume 13, page 137B).

The melting point of boric acid (170°-180° C.) and of orthorhombic metaboric acid (176° C.) are such that under the aforesaid conditions the first stage of the method according to the present invention is conducted in the virtual absence of fusion phenomena.

Stage (b)

In the second reaction stage, the orthorhombic metaboric acid [obtained in stage (a)] is heated gradually to a maximum temperature not exceeding about 400° C. and preferably not exceeding about 250° C.

In order to remove the water which evolves as a reaction byproduct, the operation is carried out at below atmospheric pressure. Good water removal is obtained on operating conveniently at a pressure of between 10 and 30 mmHg [as in the preceding stage (a)], even though still useful results are obtained outside this range.

The reaction mixture is conveniently kept moving during the metaboric acid dehydration, for example by using a rotating vessel or one provided with a stirrer. In this reaction stage, orthorhombic metaboric acid is essentially converted into monoclinic metaboric acid ($HBO_2$ II; melting point 200° C.), then into cubic metaboric acid ($HBO_2$ I; melting point 236° C.) (see the aforesaid Gmelin) and finally into boric oxide.

In order to prevent fusion phenomena, in the second stage of the method according to the present invention the temperature is raised slowly and gradually from a value of about 150° C. to 200°-210° C. Temperature increments of the order of 1°–5° C. every 20 minutes are suitable for this purpose. Under these conditions a good amount of water is evolved as a reaction byproduct. When this water development starts to subside, the temperature can be raised fairly quickly to a maximum value of about 400° C. In the preferred embodiment, the temperature is raised to a value not exceeding about 250° C.

When operating under the aforesaid conditions, boric oxide is obtained in the form of a light spongy, friable mass with little or no tendency to adhere to the walls of the apparatus used for its conversion. Thus only simple grinding and homogenisation are required to convert it into a product suitable for commercial use. Such boric oxide is also substantially free of impurities deriving from corrosion of the apparatus used for its production. The method of the present invention is simple and convenient, and requires simple apparatus constructed of normal materials such as stainless steel.

Finally, the method of the present invention has the advantage of producing metaboric acid as an intermediate, which is itself useful in certain commercial applications.

The experimental example given hereinafter illustrates but does not limit the scope of the present invention.

EXAMPLE

Crystalline boric acid is used with a crystal size of the order of 100 microns and a purity of 99.9%. 4.5 kg of this acid are fed into a stainless steel reactor fitted with a stirrer, condenser, interspace for circulation of a diathermic fluid and a device for creating a pressure less than atmospheric.

While slowly agitating the solid mass, the reaction pressure is reduced to 20 mmHg and the temperature is raised to about 115° C., over a time of 30 minutes.

Abundant water vapour development commences at this temperature. The temperature is raised gradually over a time of about one hour to 140° C., the temperature at which water vapour development tends to substantially subside. Finally, the mass is heated to 150° C. at which heating is interrupted.

3150 g of orthorhombic metaboric acid are recovered from the reactor, with a yield of 98% with respect to the boric acid feed. This metaboric acid is heated rapidly while stirring to 150° C. in the apparatus used for the first stage, and the temperature is then gradually increased by 2° C. every 10 minutes to about 205° C. During this treatment there is an abundant development of water vapour, which tends to subside beyond 205° C.

The temperature is finally raised from 205° C. to 250° C. over a time of 30 minutes, at which heating is interrupted. 2370 g of boric oxide are recovered from the reactor with a purity of 99% and a yield of 93% with respect to the boric acid feed of the first stage.

The boric oxide obtained in this manner is in the form of a light, spongy friable mass which is removed without the need for mechanical action to separate it from the reactor walls.

We claim:

1. A process for preparing boric oxide substantially free of impurities derived from the corrosion of the production apparatus in which the boric oxide is in the form of a spongy, friable mass, said process comprising:
   (a) gradually heating solid boric acid without melting at least a substantial portion of said boric acid to a temperature not exceeding about 150° C. at below atmospheric pressure until said boric acid is at least substantially converted into solid metaboric acid;
   (b) gradually heating said solid metaboric acid without melting at least a substantial portion of said metaboric acid to a temperature not exceeding about 400° C. at below atmospheric pressure until said metaboric acid is at least substantially converted into said boric oxide; and
   (c) recovering said boric oxide, wherein said boric acid, metaboric acid and boric oxide do not adhere to the production apparatus.

2. The process according to claim 1, wherein the temperature of step (a) does not exceed about 125° C. and the temperature of step (b) does not exceed about 250° C.

3. The process according to claim 1, wherein the pressure employed in both steps (a) and (b) is between 10 and 30 mmHg.

4. The process according to claim 1, further comprising conducting steps (a) and (b) under stirring.

5. The process according to claim 1, wherein in step (b) the temperature is raised by 1°–5° C. increments every 20 minutes in the range of from about 150° C. to about 200° C.

6. The process according to claim 1, wherein in step (a) boric acid is gradually heated without melting any portion of said boric acid and wherein in step (b) metaboric acid is gradually heated without melting any portion of said metaboric acid.

* * * * *